April 24, 1928.
J. L. FLANAGAN
1,667,542
IDENTIFICATION BLOTTER
Filed June 25, 1925
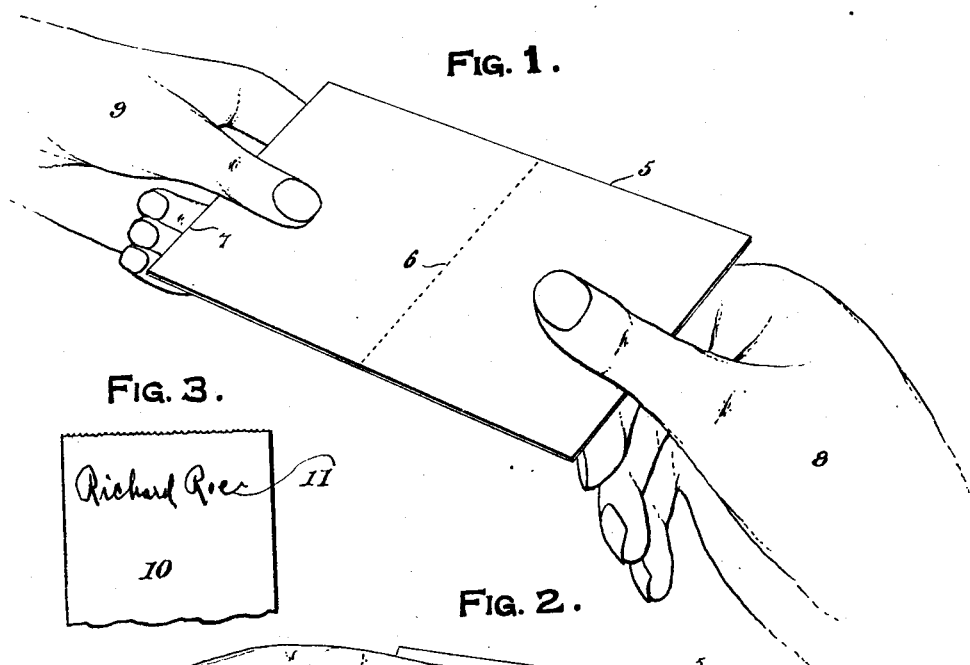
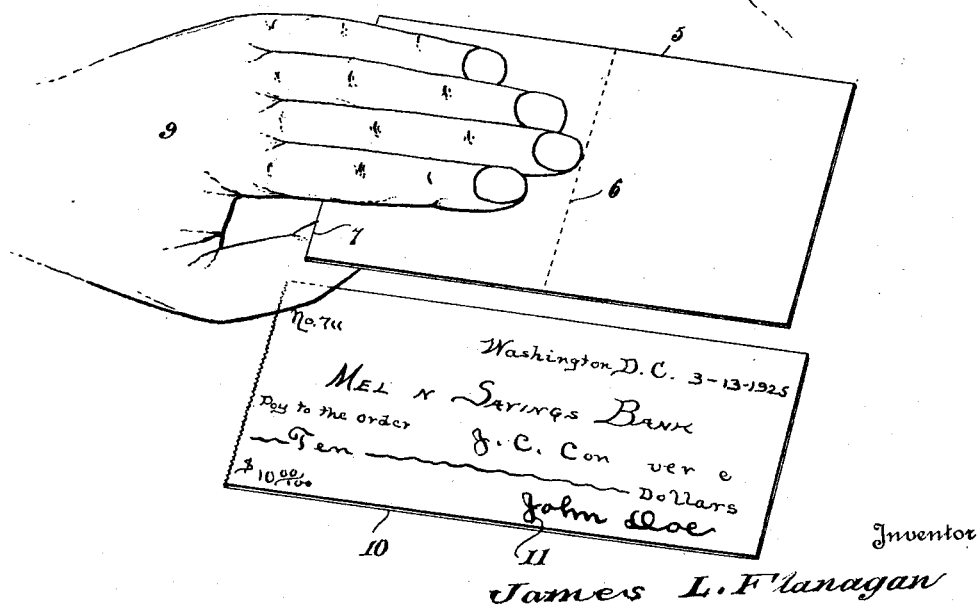

Patented Apr. 24, 1928.

1,667,542

UNITED STATES PATENT OFFICE.

JAMES L. FLANAGAN, OF SACRAMENTO, CALIFORNIA.

IDENTIFICATION BLOTTER.

Application filed June 25, 1925. Serial No. 39,524.

This invention relates to an identification blotter to be employed for the purpose of secretly obtaining the finger prints of a person presenting a check or draft for payment to the cashier of a hotel, bank, or any mercantile institution, whereby such person may be accurately identified, irrespective of the name or names he is using, should the negotiable instrument prove to be worthless.

Most persons participating in any form of business where they are called upon to receive checks, drafts, or the like in payment of debts or for the purpose of cashing the same, are familiar with the operations of so-called "check artists or swindlers." Such persons are well aware of the fact that this class of people will use fictitious or assumed names or will even forge the names of prominent business men for the purpose of obtaining money on their bogus paper. It often becomes difficult to prove the identity of the "check artist" as his appearance is generally not noticed and the name he uses is worthless for this purpose as well as for producing a valid instrument.

It is the primary object of this invention, therefore, to provide a new and useful article of manufacture, preferably in the form of a blotter, which may be employed for secretly obtaining the finger prints of all persons negotiating checks, or the like, who are unknown personally to the party receiving the same.

Other objects and advantages of the invention will be apparent during the course of the following description.

In the accompanying drawing forming a part of this specification and in which like numerals are employed to designate like parts throughout the same, Figure 1 is a perspective view of the identification blotter embodying this invention, which blotter is shown during the operation of being passed from the hand of the transferee to the hand of the transferor of a negotiable instrument, Figure 2 is a perspective view of the identification blotter and shows the same being used by the drawer of the illustrated check during the operation of blotting the same, the finger print of the check passer being unintentionally and unknowingly impressed upon the said blotter, and Figure 3 is a fragmentary plan view of a check that has been indorsed and is to be blotted in the same manner as the signature on the check shown in Fig. 2.

In the drawing, wherein for the purpose of illustration is shown a preferred embodiment of this invention, the numeral 5 designates the identification blotter embodying this invention which may be of any desired size or shape and formed of a suitable material to enable the same to perform the function of blotting or drying newly impressed ink. According to the spirit of this invention, this blotter 5 should be entirely or partially sensitized for the purpose of causing the print of any fingers coming in contact with the same to be permanently recorded or impressed thereupon. The dotted line 6 is intended to indicate a suitable division of the blotter should the manufacturer of the same desire to only sensitize a portion of the article, the sensitized portion extending from the line 6 to the end edge 7 of the blotter.

It is believed that persons skilled in the art of obtaining finger prints will be perfectly familiar with several different compounds which might be used to sensitize a blotter in such a manner that the sensitized characteristic of the same will not be apparent to the ordinary observer. It might be suggested, however, that the following ingredients may be used for sensitizing the blotter. This composition includes celluloid five grams, amyle acetate twenty-five grams, and acetone twenty-five grams. The surfaces of the blotter impregnated with the above composition should then be generally covered with varnish gum or rosin, both natural and artificial dissolved in benzine, benzol alcohols, and ethers, as well as covered with celluloid, nitrocellulose, cellulose acetate or pyroxylin, or a mixture of these as well as cellulose acetate dissolved in ethers or alcohols.

The blotter 5 is illustrated in Fig. 1 during the operation of being passed from the hand 8 to the hand 9. It is to be understood that the hand 8 represents the person honoring or receiving the negotiable instrument being transferred to him by the person represented by the hand 9. In Fig. 2 the person negotiating the check or other instrument 10 is illustrated as performing the operation of blotting the signature 11 which has just been impressed upon the said check. It will be very apparent that in handling the blotter 5, the finger prints of the hand 9 will be permanently recorded or impressed upon the sensitized blotter 5 and that such prints or impressions will form a very accurate identification of the person passing the check. After the person passing the check has received the proper amount or article which formed the consideration for the check, and has left the establishment cashing the check, the possessor of the hand 8 may file the blotter away according to any desired system, after having properly marked the blotter to enable the particular check and blottor to be correctly, collectively referred to at a later time should the check prove worthless.

If desired, the finger prints on the blotter may be dusted to bring out the lines of the prints at the time of filing away the blotter or at any other time desired. The following named ingredients may be used to dust the finger prints for making the same legible; powered graphite, aluminum, powered charcoal, lamp blank, or prussian blue.

It will be understood that should the person appearing at the mercantile establishment, or other commercial institute, for the purpose of obtaining money on a negotiable instrument, present a fully drawn check, or the like, the person cashing the paper may request the transferor to indorse the same as shown in Fig. 3, thereby enabling the receiver of the check to present the indorser with a sensitized blotter whereby he may obtain the finger prints desired. After the check has been passed through the transferee's bank or clearing house and is returned marked forged, no such account, or the like, the establishment may then refer to the identification blotter used in connection with this check and may deliver the same to the local police department or a detective bureau for use in locating and identifying the swindler.

One will readily appreciate that this identification blotter is not limited in its use to obtaining finger prints of persons cashing or passing negotiable instruments for it may as readily be used by credit managers of financial and commercial institutions to whom persons apply for credit accounts, or by parties having charge of the employing of persons to fill places of importance and trust, whereby the past history of such persons may be more readily and accurately obtained, should such persons happen to have a police record, or the like.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. As a new article of stationery, a sheet of ink blotting material treated to provide a surface adapted to readily receive finger print impressions when the sheet is handled under normal conditions of use.

2. As a new article of stationery, a sheet of ink blotting paper treated to provide opposite surfaces adapted to readily receive finger print impressions when the sheet is handled under normal conditions of use.

3. As a new article of stationery, a sheet of ink blotting paper treated to provide a surface adapted to readily receive finger print impressions when the sheet is handled under normal conditions of use; with the impressions normally invisible but capable of being rendered visible by a dusting operation.

4. As a means for promoting the production of finger print identification without knowledge of the producer, a sheet of commercial blotting paper treated on the surface with a material which unfailingly retains the finger print of the handler, the applied material being of such character as to not impair the use of the treated sheet as a blotter, the sheet being of a size and shape to correspond with the size and shape of an ordinary loose blotting sheet.

In testimony whereof I affix my signature.

JAMES L. FLANAGAN.